US012062083B1

(12) United States Patent
Sondag

(10) Patent No.: US 12,062,083 B1
(45) Date of Patent: Aug. 13, 2024

(54) SYSTEMS FOR DETERMINING USER INTERFACES TO MAXIMIZE INTERACTIONS BASED ON WEBSITE CHARACTERISTICS

(71) Applicant: AMAZON TECHNOLOGIES, INC., Seattle, WA (US)

(72) Inventor: Pierre-Antoine Sondag, Bascharage (LU)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 282 days.

(21) Appl. No.: 17/447,240

(22) Filed: Sep. 9, 2021

(51) Int. Cl.
*G06Q 30/00* (2023.01)
*G06F 16/953* (2019.01)
*G06N 20/00* (2019.01)
*G06Q 30/0601* (2023.01)

(52) U.S. Cl.
CPC ....... *G06Q 30/0641* (2013.01); *G06F 16/953* (2019.01); *G06N 20/00* (2019.01)

(58) Field of Classification Search
CPC .............. G06Q 30/00; G06Q 30/0601; G06Q 30/0609; G06Q 30/0613; G06Q 30/0641
See application file for complete search history.

(56) References Cited

U.S. PATENT DOCUMENTS

| | | | | |
|---|---|---|---|---|
| 7,881,944 B2 * | 2/2011 | Heller | ................. | G06Q 30/0185 705/319 |
| 2002/0147694 A1 * | 10/2002 | Dempsey | .............. | G06F 18/214 706/20 |
| 2005/0283836 A1 * | 12/2005 | Lalonde | ................. | G06F 21/563 713/188 |
| 2006/0224960 A1 * | 10/2006 | Baird-Smith | ........... | H04L 67/01 707/E17.112 |
| 2008/0162302 A1 * | 7/2008 | Sundaresan | ........ | G06Q 30/0633 705/7.29 |
| 2009/0254499 A1 * | 10/2009 | Deyo | ..................... | G06Q 10/10 706/12 |
| 2010/0205430 A1 * | 8/2010 | Chiou | .................... | G06Q 50/01 713/156 |

(Continued)

OTHER PUBLICATIONS

Jakulin, Aleks. Machine learning based on attribute interactions. Diss. Univerza v Ljubljani, 2005. (Year: 2005).*
Zuber, Joya, Hugues Vincent, and Isaac Andres. "Prediction of Traffic for Internet Domains." (2016). (Year: 2016).*

*Primary Examiner* — Christopher B Seibert
(74) *Attorney, Agent, or Firm* — Lindauer Law, PLLC

(57) ABSTRACT

Data from a first website and second website is used to determine a model for presenting a search output in response to a query received by the first website. The data from each website includes parameters of search queries, characteristics of items that were output in response, and an indication of items that were purchased. Characteristics of the first website are used to determine weights that are applied to data from the second website. A relationship between search queries received by each website is used to determine a first weight. A relationship between features or options offered by the second website and those offered by the first website is used to determine a second weight. For example, if the second website offers a service that the first website does not, the availability of this service for particular items may be disregarded when determining the model for the first website.

20 Claims, 6 Drawing Sheets

(56) References Cited

U.S. PATENT DOCUMENTS

| | | | | |
|---|---|---|---|---|
| 2010/0287061 | A1* | 11/2010 | Terheggen | G06Q 20/12 705/26.1 |
| 2012/0066040 | A1* | 3/2012 | Farraro | G06Q 30/0209 705/14.1 |
| 2012/0203663 | A1* | 8/2012 | Sinclair | G06Q 30/06 713/168 |
| 2012/0221557 | A1* | 8/2012 | Edmonds | G06Q 30/0282 707/723 |
| 2013/0290707 | A1* | 10/2013 | Sinclair | H04L 9/3226 713/161 |
| 2014/0156383 | A1* | 6/2014 | Vijayaraghavan | G06Q 30/0244 705/14.54 |
| 2014/0304210 | A1* | 10/2014 | Bates | H04L 41/147 706/46 |
| 2014/0325453 | A1* | 10/2014 | Poon | G06Q 30/08 715/841 |
| 2015/0127565 | A1* | 5/2015 | Chevalier | G06Q 10/00 705/319 |
| 2016/0086029 | A1* | 3/2016 | Dubuque | G06V 20/63 382/159 |
| 2017/0262635 | A1* | 9/2017 | Strauss | G06Q 30/0275 |
| 2019/0068733 | A1* | 2/2019 | Lewis | H04L 67/53 |
| 2019/0171767 | A1* | 6/2019 | Bolla | G06F 16/9535 |
| 2019/0205888 | A1* | 7/2019 | Nandy | G06Q 20/405 |
| 2019/0228105 | A1* | 7/2019 | Ma | G06N 7/01 |
| 2020/0226653 | A1* | 7/2020 | Johnson | G06Q 30/0609 |
| 2021/0034631 | A1* | 2/2021 | Rahman | G06F 16/9536 |
| 2021/0233142 | A1* | 7/2021 | Xin | G06Q 30/06 |

\* cited by examiner

SYSTEMS FOR DETERMINING USER INTERFACES TO MAXIMIZE INTERACTIONS BASED ON WEBSITE CHARACTERISTICS

BACKGROUND

Websites associated with online stores are typically configured to receive a search query and present a list of items having characteristics that correspond to the search query. In some cases, the presented list may be arranged in a manner that prioritizes certain items, such as by using historical data to present items that are more likely to be purchased prior to other items. However, use of historical data to determine an arrangement of items may prioritize certain items, while failing to prioritize other items, due to characteristics of the items that are not relevant to a particular website.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
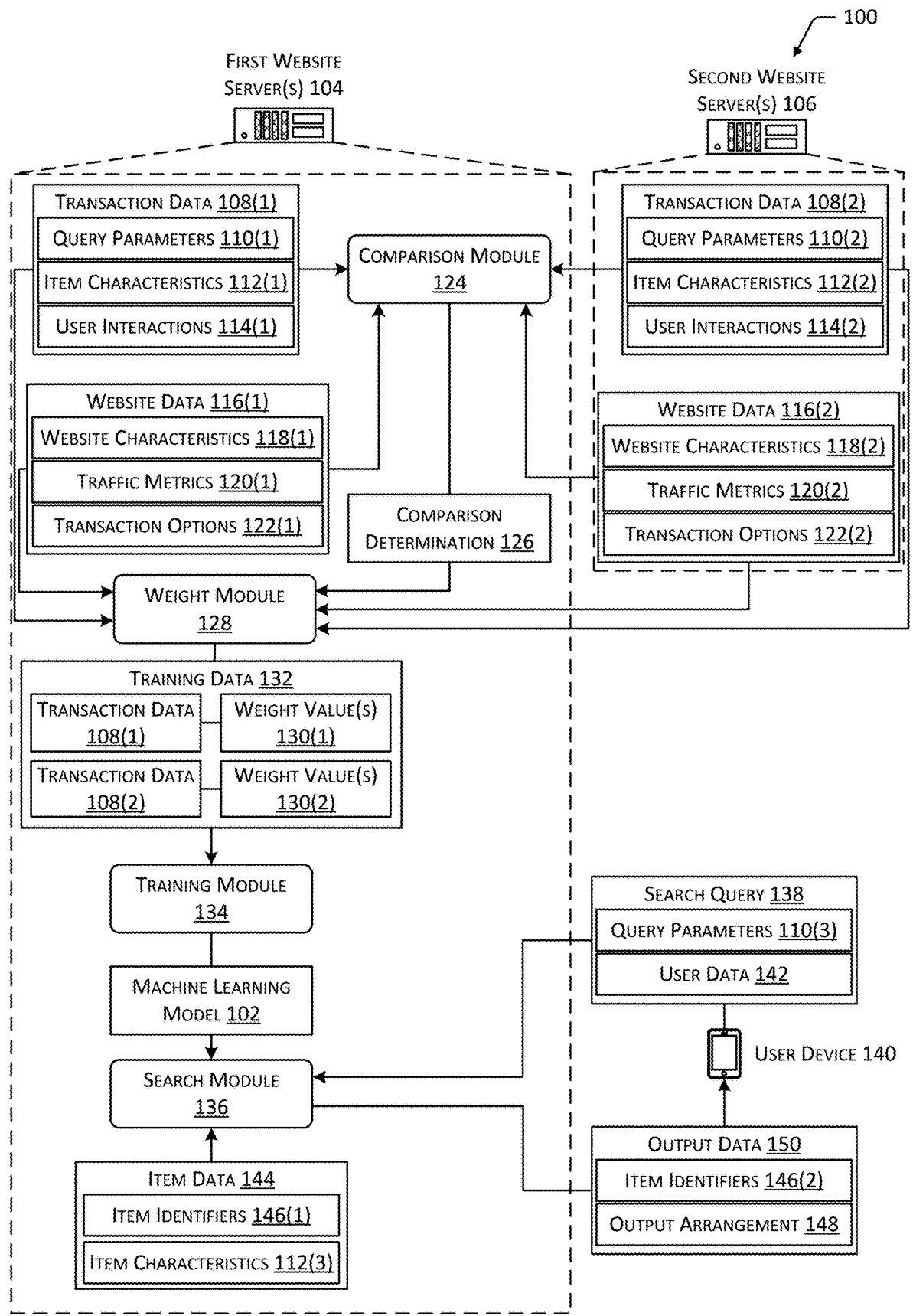
FIG. 1 is a block diagram depicting an implementation of a system for training a machine learning model using data from multiple websites to determine responses to queries, or other types of output.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to coverall modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

An entity associated with an online store may offer items or services for purchase, lease, subscription, and so forth using one or more websites. For example, a first website may include a set of webpages that include information associated with items available for purchase within a first geographic region, while a second website may include a set of webpages that include information associated with items available for purchase within a second geographic region. The webpages within a website may include user interfaces that present information regarding various items, such as an item name, price, description, one or more images of the item, ratings or reviews associated with the item, options for payment or shipment of the item, and other characteristics. The webpages within a website may also include other user interfaces for obtaining information regarding items, completing purchases, maintaining information regarding a user account such as shipping or payment information, landing pages, and so forth. For example, one or more webpages may include a control for receiving a search query from a user, and in response to the search query, a search output that includes a list or other arrangement of items that correspond to the parameters of the search query may be presented.

In some cases, a website may be configured to arrange the items presented in a search output in a manner that increases the likelihood of a subsequent user interaction, such as completion of a purchase transaction. For example, if a particular item has historically been purchased by a large number of users, if a particular item is associated with desirable characteristics such as expedited shipping or favorable payment options, or if the particular user that provided a search query has historically purchased a certain type of item, these particular items may be presented in an output prior to other items to maximize the likelihood that a user reviewing the search output will see the items and have an opportunity to obtain additional information, purchase the item(s) if desired, and so forth. Some websites may use various machine learning algorithms to determine combinations of characteristics of items, users, and search query parameters that may be associated with a higher probability of a completed purchase transaction, lease, subscription, or other type of user interaction.

However, when an entity maintains multiple websites that are associated with different geolocations for which different items are available, different items have historically been purchased, leased, and so forth, by significant numbers of users, and different shipping or payment options are available, the search output presented using a machine learning algorithm that maximizes the probability of further user interaction for a first website may be unsuitable for use with a second website. For example, a particular item may be available using expedited shipping when purchased using a first website associated with a first geolocation, but expedited shipping to a second geolocation associated with a second website may be unavailable. A machine learning algorithm that prioritizes presentation of the particular item due in part to the availability of expedited shipping may not effectively maximize the likelihood of further user interaction when prioritizing presentation of the particular item for the second website when expedited shipping is unavailable. Therefore, use of a single machine learning algorithm across multiple websites may lead to suboptimal results that do not account for the individual features of each website. However, when an entity maintains a significant number of websites, the creation, training, and maintenance of individual machine learning algorithms for each individual website may be impractical. For example, training of a machine learning algorithm may typically require three months or more, and the use of multiple machine learning algorithms may facilitate the algorithms becoming stale and reduce the rate at which innovations to particular algorithms and websites are implemented.

Described in this disclosure are techniques for training and use of a machine learning model that may be used across multiple websites by training the algorithm using particular types of data that are specific to each website to determine the weight or applicability of other data associated with search queries, item characteristics, user accounts, and other websites. A machine learning model for use with a first website may be trained using training data that represents previous transactions associated with the first website, and training data that represents previous transactions associated with one or more other websites. Data regarding a transaction may include an indication of a search query that was received, the search query having one or more parameters. Parameters of a search query may include terms or keywords, an arrangement of terms or keywords, punctuation, a language used, and so forth. Data regarding a transaction may also include an indication of the items that were output in response to the search query, each item being associated with one or more characteristics. Characteristics of an item may include an item category, price, size, color, rating, review, shipping or payment options that may be used to acquire the item, and so forth. Data regarding a transaction may additionally include an indication of items that were purchased, leased, subscribed, or that were associated with additional user interaction, such as navigation to a webpage that includes additional information about the item, addition of the item to an electronic list or shopping cart, and so forth.

Training data associated with the first website may be weighted based in part on user interactions associated with the first website. For example, a first set of weights may be associated with search query parameters and item characteristics based on the quantity or percentage of transactions for which an item was purchased or associated with additional user interactions. In some implementations, the first set of weights may be determined based on data specific to the first website, such as a traffic metric associated with the first website. A traffic metric may be used to determine a quantity of purchases, leases, subscriptions, or other user interactions associated with the first website that may be regarded as significant. For example, a traffic metric may include a count of search queries received in association with the first website, a count of user interactions received in association with the first website, a count of user accounts associated with the first website, a quantity of data (e.g., traffic or data throughput) received in association with the first website, and so forth. Continuing the example, the count of search queries associated with the first website may be used in combination with a count of purchases, leases, subscriptions, or other user interactions associated with an item to determine a weight to be associated with one or more characteristics of the item. In some cases, training data associated with the first website may be weighted based in part on data associated with website options, such as purchasing options or shipping options associated with the first website. For example, if expedited shipping of a particular item is normally available, but the first website does not offer use of expedited shipping, this characteristic of items may be associated with a small weight or a weight of zero when training the machine learning model.

Training data associated with the second website may be weighted for use training the machine learning model for use with the first website based on similarities and differences between the first website and the second website. For example, website characteristics for the first website, such as a language, currency, or location associated with the first website, may be compared to similar website characteristics for the second website. If the characteristics of the second website do not correspond to those of the first website within at least a threshold similarity, data associated with the second website may be associated with a small weight or a weight of zero (e.g., disregarded) when training the machine learning model for use with the first website.

As another example, a set of weights may be determined for search query parameters and item characteristics associated with previous transactions for the second website based on differences in previous counts of search queries or other traffic metrics associated with the first website and those associated with the second website. For example, a significant difference in amounts of search queries received by the first and second websites may cause data associated with the second website to be overrepresented or underrepresented when training the machine learning model for use with the first website. A relationship between the previous counts of search queries or other traffic may be used to determine a weight to be associated with data for the second website. For example, if the second website is associated with a significantly greater count of queries than the first website, a weight that decreases the impact of the data from the second website on the machine learning model may be determined. Additionally, weights may be determined based on differences between website options associated with the first and second websites. For example, if the second website offers an expedited shipping option that is not offered by the first website, this may result in greater user interaction for items for which expedited shipping is available when using the second website. When training the machine learning model for use with the first website, a low weight value, or a weight value of zero, for this item characteristic may be determined, which may limit the impact of this characteristic on the machine learning model for the first website.

The machine learning model is trained based on training data from the first website, training data from the second website, and the associated weights determined based on the characteristics of the first website, the characteristics of the second website, and differences between the characteristics of the first website and those of the second website. After training the machine learning model, the machine learning model may be used to generate recommendations for items, responses to search queries, or other types of output based on a probability of purchases or other user interactions associated with the presented items. For example, a search query may be received using the first website. The search query may include one or more parameters, such as terms or keywords, an arrangement of terms or keywords, punctuation, a language associated with the terms or keywords, and so forth. Correspondence between the parameters of the search query and item data indicative of characteristics of items associated with the first website may be determined. Based on the machine learning model, an arrangement of the items that maximizes a probability of purchase or other user interaction with one or more of the items included in a search output may be determined. Output data may then be provided to a device associated with the search query to cause the device to present a list or other type of output that includes the items that correspond to the search query, having the arrangement determined using the machine learning model. For example, items most likely to be purchased may be presented earlier in a list than other items. The output determined using the machine learning model may be based in part on the specific characteristics of the first website, while a different output may be presented if a website having other characteristics receives a similar search query. For example, if expedited shipping is available using the first website, presentation of items for which expedited shipping is possible may be undertaken based on a higher probability of purchase for such items, even in cases where the prioritized items do not correspond as closely to the search query parameters as other items. Conversely, if expedited shipping is not available using the second website, different items may be presented in response to an identical search query, or items may be presented using a different arrangement, based on different probabilities of purchase due to the unavailability of expedited shipping. Thus, different websites that use the same machine learning model may generate different outputs in response to an identical search query based on different characteristics of the individual websites that result in different probabilities of user interaction with the items presented in the outputs.

As a result, a machine learning model for ranking or otherwise arranging items included in a search output, or generating recommendations or other information regarding items, to maximize the probability of subsequent user interaction may be trained using data from multiple websites, and provide accurate results when used across multiple websites. For example, the machine learning model may disregard or associate a low weight with particular characteristics of items based on characteristics of a specific website, reducing the likelihood of data from other websites causing the machine learning model to present a suboptimal arrangement or recommendation for items when used with the specific website. Additionally, the machine learning model may associate weights with various parameters based on counts of queries or other traffic metrics associated with websites, preventing data from a website having a large or small amount of traffic from being overrepresented or underrepresented, respectively. Therefore, when a website is newly established or when insufficient data exists to train a machine learning model, the machine learning model may be trained to use data from other websites, in conjunction with characteristics specific to the newly established website, to determine outputs that accurately maximize the probability of further user interaction.

FIG. 1 is a block diagram 100 depicting an implementation of a system for training a machine learning model 102 using data from multiple websites to determine responses to queries, or other types of output. One or more first website servers 104 may be associated with a first website. For example, a first website may include one or more webpages associated with an online store, such as webpages that include information associated with items available for purchase, lease, subscription, and so forth within a first geographic region. One or more second website servers 106 may be associated with a second website, which may include a set of webpages that include information associated with items available for purchase, lease, subscription, and so forth within a second geographic region. In some implementations one or more of the websites may be associated with multiple geographic regions. Additionally, in some implementations, the first website and the second website may be associated with the same geographic region, but may have different characteristics associated with the sale of items. For example, if a geographic region uses multiple languages or currencies, the first website may offer items for purchase using a first language or currency while the second website offers items for purchase using a second language or currency. Additionally, while FIG. 1 depicts the first website server(s) 104 and second website server(s) 106 as separate computing devices, in some implementations, a single website server or set of website servers may be used to provide access to both the first and second websites.

Data from the first website server(s) 104 that is used to train the machine learning model 102 may be determined based in part on transaction data 108(1) associated with the first website server(s) 104. The transaction data 108(1) may represent purchase transactions, or other types of transactions or interactions, that previously occurred using the first website. For example, a transaction represented by the transaction data 108(1) may include one or more query parameters 110(1), such as terms or keywords included in a query, an arrangement of the terms or keywords, a language of the terms or keywords, punctuation or other features of the query, and so forth. In response to the query that includes the query parameters 110(1), information regarding one or more items may have been previously presented. A transaction may therefore also include item characteristics 112(1) associated with the items for which information was presented in response to the query. Item characteristics 112(1) may include a name, title, or other identifier indicative of an item, a category associated with the item, a price of the item, terms or keywords in a description of the item, characteristics of one or more images of the item, characteristics of a rating or review associated with the item, and so forth. Item characteristics 112(1) may also include one or more options associated with acquisition of the item, such as shipping or payment options. For example, a particular item may be available using expedited shipping, or may be purchased using installment payments. A transaction may also include an indication of one or more user interactions 114(1) that occurred after information regarding one or more items was presented in an output. For example, after providing a query and receiving an output presenting information regarding one or more items, a user may purchase an item, select a navigational link to navigate to a webpage that includes additional information regarding the item, add an indication of the item to an electronic list or shopping cart, and so forth. In some implementations, user interactions 114(1) may include data regarding the position of a cursor, touch or near-touch gesture, gaze, or other data that may indicate user interest regarding one or more items.

Data from the first website server(s) 104 that is used to train the machine learning model 102 may also include website data 116(1) indicative of one or more features or characteristics of the first website. For example, website data 116(1) may include website characteristics 118(1) associated with the first website, such as a language, currency, or location associated with the first website. Website data 116(1) may also include traffic metrics 120(1), which may include one or more indicators that represent the number of queries, transactions, or interactions associated with the first website. For example, traffic metrics 120(1) may include a count of search queries received in association with the first website for a selected period of time, a count of user interactions 114(1) received in association with the first website for a selected period of time, a count of user accounts associated with the first website, a quantity of data sent or received in association with the first website, and so forth. In some implementations, one or more traffic metrics 120(1) may be associated with particular items or item categories. For example, a traffic metric 120(1) may include a count of queries or interactions associated with items having a particular category rather than counts of queries or interactions for an entire website associated with the first website server(s) 104. Website data 116(1) may additionally include an indication of transaction options 122(1) associated with the first website. Transaction options 122(1) may include payment or shipping options that are available using the first website. For example, a transaction option 122(1) may include the availability of expedited shipping, free or reduced-priced shipping, types or categories of items or conditions (such as price thresholds) for which expedited, free, or reduced-price shipping is available, and so forth. A transaction option 122(1) may include the availability of particular payment methods, such as use of credit instruments, bank transactions, payment processors, payment using installments, and so forth.

Data from the second website server(s) 106 that is used to train the machine learning model 102 may be determined based in part on transaction data 108(2) that represents purchases, leases, subscriptions, or other types of transactions associated with the second website. The transaction data 108(2) associated with the second website server(s) 106 may include indications of query parameters 110(2), item characteristics 112(2), and user interactions 114(2), as described with regard to the transaction data 108(1) associated with the first website server(s) 104. For example, the second website may offer one or more of the same or different items when compared to the first website, and may receive one or more of the same or different types of query parameters 110(2) or user interactions 114(2) as those received in association with the first website.

Data from the second website server(s) 106 that is used to train the machine learning model 102 may also be determined based in part on website data 116(2) indicative of one or more features or characteristics of the second website. For example, website data 116(2) for the second website may include website characteristics 118(2) associated with the second website. Continuing the example, the second website may be associated with one or more of the same or different languages, currencies, or locations when compared to the first website. The website data 116(2) may include traffic metrics 120(2) associated with the second website. For example, the second website may be associated with a greater or lesser number of queries, interactions, transactions, count of user accounts, or quantity of data sent or received when compared to the first website. The website data 116(2) may also include an indication of transaction options 122(2) associated with the second website. For example, the second website may include one or more payment or shipping options that correspond to or differ from the payment or shipping options associated with the first website.

A comparison module 124 associated with the first website server(s) 104 may determine correspondence between the transaction data 108(1) associated with the first website server(s) 104 and the transaction data 108(2) associated with the second website server(s) 106. The comparison module 124 may also determine correspondence between the website data 116(1) associated with the first website server(s) 104 and the website data 116(2) associated with the second website server(s) 106. While FIG. 1 depicts the comparison module 124 associated with the first website server(s) 104, in other implementations, the comparison module 124 may be associated with the second website server(s) 106, or with one or more other computing devices in communication with the first website server(s) 104. The comparison module 124 may determine a comparison determination 126 indicative of similarities or differences between the transaction data 108 and website data 116 associated with the first website server(s) 104 and the second website server(s) 106. For example, the comparison determination 126 may indicate similarities or differences between languages, currencies, or locations associated with the first and second websites, items available using the first and second websites, queries or interactions received using the first and second websites, traffic metrics 120 associated with the first and second websites, and shipping, payment, or other transaction options 122 available using the first and second websites.

Similarities and differences between the transaction data 108 and website data 116 may be used to determine weights to be associated with different portions of the data when training the machine learning model 102. For example, query parameters 110(1) and item characteristics 112(1) associated with the first website server(s) 104 may be weighted based on the user interactions 114(1) that occurred in association with particular items subsequent to particular queries. As another example, item characteristics 112(1) associated with the first website sever(s) 104, such as the possibility to ship a particular item using expedited shipping, may be weighted based on transaction options 122(1) for the first website, such as the availability or unavailability of expedited shipping, the conditions under which expedited shipping is available, and so forth. As yet another example, data associated with the second website server(s) 106 may be associated with a low weight or a weight of zero based on differences between the languages, currencies, and locations associated with the first and second websites, or associated with a greater weight based on similarities between such website characteristics 118. Data associated with the second website server(s) 106 may be weighted based on differences between the traffic metrics 120(2) associated with the second website and the traffic metrics 120(1) associated with the first website. For example, if the second website is associated with a significantly greater number of received search queries when compared to the first website, this may result in data associated with the second website server(s) 106 being associated with a lower weight. Conversely, if the second website is associated with a significantly lesser number of received search queries when compared to the first website, this may result in data associated with the second website server(s) 106 being associated with a higher weight. Data associated with the second website server(s) 106 may also be weighted based on differences between the transaction options 122(2) associated with the second website and the transaction options 122(1) associated with the first website. For example, if the second website offers a feature, such as expedited shipping, and this feature is not offered by the first website, transactions associated with the second website that involve an item that is available using expedited shipping may be associated with a lesser weight or a weight of zero.

A weight module 128 associated with the first website server(s) 104 may determine one or more sets of weight values 130 to be associated with portions of the transaction data 108(1) associated with the first website server(s) 104 and portions of the transaction data 108(2) associated with the second website server(s) 106. For example, a weight module 128 may determine training data 132 that may be used to train the machine learning model 102 based on the transaction data 108 for the first and second websites, the website data 116 for the first and second websites, and weight values 130 determined based in part on the comparison determination 126. Continuing the example, FIG. 1 depicts the training data 132 having a first set of weight values 130(1) associated with the first transaction data 108(1) and a second set of weight values 130(2) associated with the second transaction data 108(2). A set of weight values 130 may include multiple different weight values 130 that are associated with different portions of the corresponding transaction data 108. For example, transactions having particular characteristics, such as particular query parameters 110, item characteristics 112, or user interactions 114, may be associated with a particular weight value 130, while other transactions are associated with different weight values 130. While FIG. 1 depicts the weight module 128 associated with the first website server(s) 104, in other implementations, the weight module 128 may be associated with the second website server(s) 106, or with one or more other computing devices in communication with the first website server(s) 104.

A training module 134 associated with the first website server(s) 104 may determine a machine learning model 102 based at least in part on at least a portion of the training data 132. While FIG. 1 depicts the training module 134 associated with the first website server(s) 104, in other implementations, the training module 134 may be associated with the second website server(s) 106, or with one or more other computing devices in communication with the first website server(s) 104. Additionally, while FIG. 1 depicts the comparison module 124, weight module 128, and training module 134 as separate components of the first website server(s) 104, in other implementations, a single module, such as the training module 134, may determine weight values 130 based on transaction data 108 and website data 116. Any single module or combination of multiple modules may perform the functions of the comparison module 124, weight module 128, and training module 134 described herein.

The machine learning model 102 may be configured to determine responses to queries, recommendations, or other types of output that optimize the probability that a purchase, lease, subscription, or other types of user interactions may occur. For example, a search module 136 associated with the first website server(s) 104 may receive search queries 138 from one or more user devices 140. A search query 138 may be associated with query parameters 110(3), such as terms or keywords, an arrangement of terms or keywords, languages associated with terms or keywords, and so forth. A search query 138 may also be associated with user data 142 indicative of a user account, user device 140, and so forth. For example, user data 142 may include or may be used to determine data indicative of previous user interactions 114 associated with a user account or user device 140, such as a purchase history, search history, browsing history, and so forth.

The search module 136 may determine correspondence between the query parameters 110(3) of the search query 138 and item data 144 indicative of one or more items available for purchase, lease, subscription, and so forth using the first website. The item data 144 may associate item identifiers 146(1) or other data indicative of particular items with corresponding item characteristics 112(3) for each item. Item characteristics 112(3) for an item may include a name, category, price, available payment or shipping options, and so forth that may be associated with the item. Based on correspondence between the item characteristics 112(3) of the item data 144 and the query parameters 110(3) of the search query 138, the search module 136 may determine item identifiers 146(2) for a particular subset of items having item characteristics 112(3) that correspond to the query parameters 110(3).

Based on the machine learning model 102, the search module 136 may also determine an output arrangement 148 associated with the determined item identifiers 146(2). For example, the machine learning model 102 may be used to determine an order or arrangement for information associated with the determined items that may maximize a probability that a purchase, lease, subscription, or other user interaction 114 associated with one or more of the items will occur. For example, the machine learning model 102, which was determined based in part on previous transactions associated with the first and second websites, may weight data associated with the first and second websites based on previous purchases or other interactions, and may take into account the differences between the first website and second website that may result in particular portions of the data from the second website being associated with a lesser weight, a greater weight, or a weight of zero. In some implementations, user data 142, such as a history of user interactions 114 associated with a user account or user device 140, may also be used in combination with transaction data 108 and website data 116 to determine the output arrangement 148. In some implementations, the output arrangement 148 may include a list of items in which items that appear earlier in the list prior to other items may be associated with a greater probability of a purchase, lease, subscription, or other user interaction 114. Output data 150 may be provided to the user device 140 to cause information regarding the items represented by the item identifiers 146(2) to be presented using the determined output arrangement 148. In other implementations, output data 150 may include recommendations or other information indicative of one or more items based on a likelihood of user interaction associated with the item(s), in addition to or in place of an arrangement of items within a list or other data structure.

Figure 2:
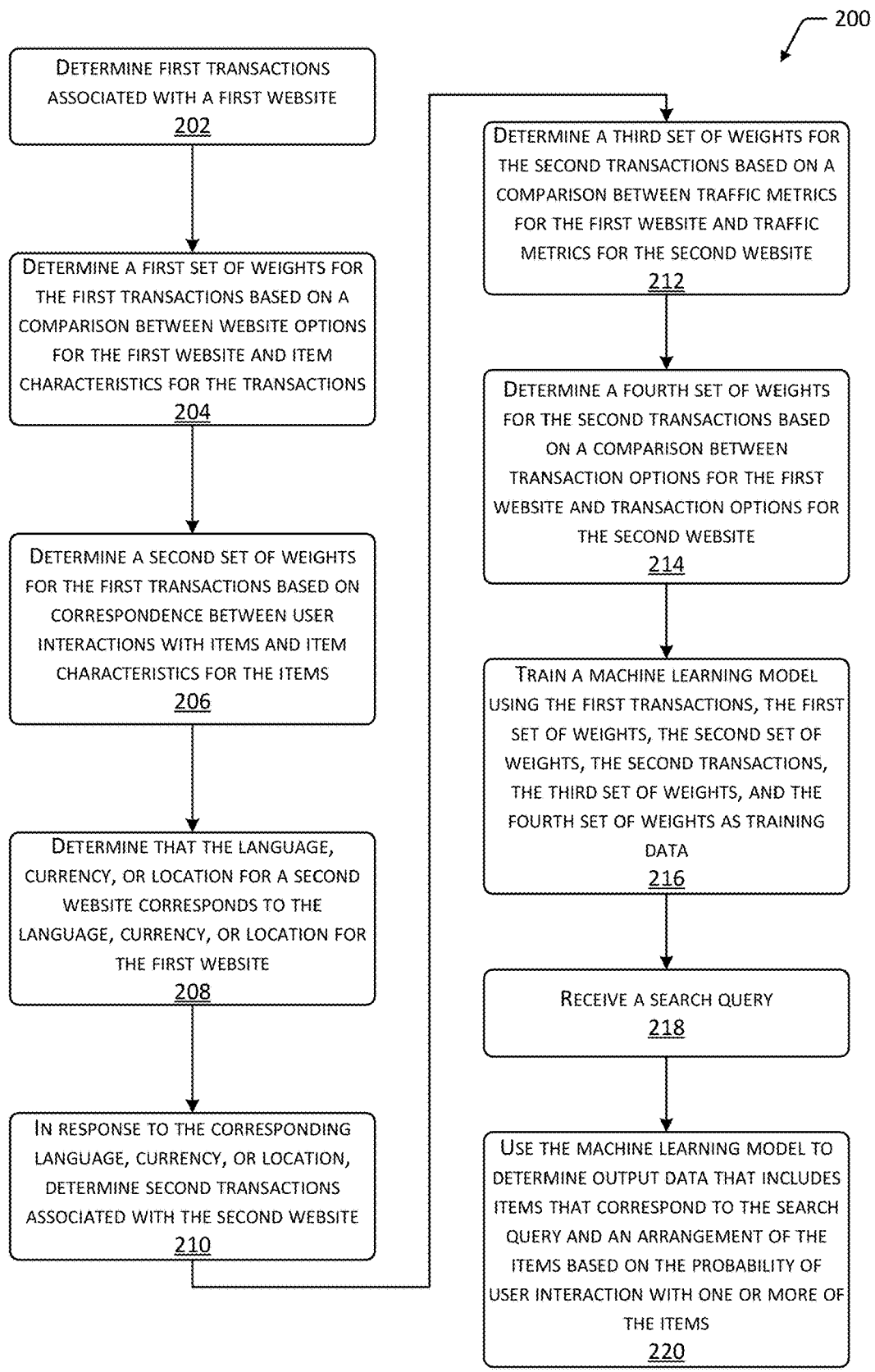
FIG. 2 is a flow diagram depicting an implementation of a method for training a machine learning model using data from multiple websites and using the machine learning model to determine an output in response to a query, or other types of output.

FIG. 2 is a flow diagram 200 depicting an implementation of a method for training a machine learning model 102 using data from multiple websites and using the machine learning model 102 to determine an output in response to a query, or other types of output. At 202, a first set of transactions associated with a first website may be determined. The first website may include one or more webpages associated with an online store, at least a subset of the webpages including information regarding one or more items. One or more of the webpages may include a control for receiving a search query 138, in response to which output data 150 indicative of items having item characteristics 112 that correspond to the query parameters 110 of the search query 138 may be determined. The machine learning model 102 may be trained to determine an output arrangement 148 that maximizes the probability of a purchase, lease, subscription, or other types of user interactions 114 in response to a presented output, based on previous transactions that have occurred with regard to the first website, and with regard to the second website. In other implementations, the machine learning model 102 may be used to determine other types of output, such as recommendations or other information associated with items independent of a search query 138, based on the probability of user interaction associated with the items. As described with regard to FIG. 1, transaction data 108(1) associated with the first website may represent a first set of transactions associated with the first website. Each transaction may be associated with one or more sets of query parameters 110(1). For example, one or more search queries 138 that include the query parameters 110(1) may have been previously received. Each set of query parameters 110(1) may be associated with a corresponding set of item characteristics 112(1) for at least a subset of the items for which information was presented in response to a query that includes the query parameters 110(1). A transaction may also include a set of user interactions 114(1), which may include an indication of purchases or other types of interactions that occurred after information regarding one or more items was output in response to a query that includes the query parameters 110(1).

At 204, a first set of weights for the first transactions may be determined based on a comparison between website options for the first website and item characteristics 112 for the transactions. For example, the first website may be associated with one or more transaction options 122(1), such as particular shipping or payment options, conditions under which the particular shipping or payment options are available, and so forth. Continuing the example, the first website may offer expedited shipping for certain items that are able to be shipped using expedited shipping, the first website may not offer expedited shipping regardless of whether an item is able to be shipped using expedited shipping, or the first website may offer expedited shipping for certain items if one or more conditions are met, such as a price threshold. One possible item characteristic 112 for an item may include whether the item is able to be shipped using expedited shipping. In cases where a particular transaction option 122(1) is available using the first website and an item characteristic 112 indicates that this transaction option 122(1) is usable with an item, a greater weight may be associated with this item characteristic 112. In cases where this particular transaction option 122(1) is not available using the first website, a corresponding item characteristic 112 may be associated with a low weight or a weight of zero.

At 206, a second set of weights for the first transactions may be determined based on correspondence between user interactions 114(1) with items and item characteristics 112(1) for the items. For example, if a significant number of users (e.g., greater than an average number or a threshold number) have purchased items having a particular characteristic or set of characteristics using the first website, these item characteristics 112(1) may be associated with a greater weight. If zero users or a number of users less than an average or threshold number of users have purchased items having a particular characteristic or set of characteristics using the first website, these item characteristics 112(1) may be associated with a negative weight. If a number of users within a threshold range of an average or threshold number of users have purchased items having a particular characteristic or set of characteristics using the first website, these item characteristics 112(1) may be associated with a small weight or a weight of zero.

At 208, a determination may be made that the language, currency, or location for a second website corresponds to the language, currency, or location for the first website. For example, if the characteristics of the second website do not correspond to those of the first website within at least a threshold similarity, data associated with the second website may be associated with a small weight or a weight of zero (e.g., disregarded) when training the machine learning model 102 for use with the first website. However, if the characteristics of the second website correspond to those of the first website within a threshold similarity, this may indicate that user interactions 114 associated with the second website are more likely to be similar to those associated with the first website under similar conditions, such as in response to particular item characteristics 112, transaction options 122, and so forth.

At 210, in response to the corresponding language, currency, or location for the websites, a set of second transactions associated with the second website may be determined. For example, transaction data 108(2) associated with the second website may represent a second set of transactions associated with the second website. Each transaction may be associated with one or more sets of query parameters 110(2), a corresponding set of item characteristics 112(2) for at least a subset of the items for which information was presented in response to a query that includes the query parameters 110(2), and user interactions 114(2) that occurred after information regarding one or more items was output in response to a query.

At 212, a third set of weights may be determined for the second set of transactions based on a comparison between traffic metrics 120(1) for the first website and traffic metrics 120(2) for the second website. Traffic metrics 120 may represent a quantity of traffic (e.g., data, transactions, users, and so forth) associated with a website. For example, traffic metrics 120 may include a count of search queries received in association with a website for a selected period of time, a count of user interactions 114 received in association with a website for a selected period of time, a count of user accounts associated with a website, a quantity of data sent or received in association with a website, and so forth. Continuing the example, if one or more traffic metrics 120(2) associated with the second website indicate a significantly greater amount of traffic than that of the first website, such as an amount that differs from traffic associated with the first website by at least a threshold value, transaction data 108(2) associated with the second website may be associated with a lower weight. However, if the traffic metric(s) 120(2) associated with the second website indicate a significantly lesser amount of traffic than that of the first website, transaction data 108(2) associated with the second website may be associated with a greater weight. In some implementations, if the traffic metric(s) 120(2) associated with the second website differ form the traffic metric(s) 120(1) associated with the first website by more than a threshold amount, transaction data 108(2) associated with the second website may be associated with a low weight or a weight of zero.

At 214, a fourth set of weights may be determined for the second set of transactions based on a comparison between the transaction options 122(1) for the first website and the transaction options 122(2) for the second website. For example, if the second website offers a transaction option 122(2) that is not available when using the first website, items that may be purchased or shipped based on this transaction option 122(2) using the second website may be associated with a greater amount of user interaction 114(2) due to the availability of the transaction option 122(2). In such a case, portions of transaction data 108(2) for the second website that are associated with items available using this transaction option 122(2) may be associated with a low weight or a weight of zero. In cases where transaction options 122(1) for the first website correspond to the transaction options 122(2) for the second website, portions of the transaction data 108(2) for the second website may be associated with a greater weight.

At 216, a machine learning model 102 may be trained using the first transactions, the first set of weights, the second set of weights, the second transactions, the third set of weights, and the fourth set of weights as training data 132. For example, the machine learning model 102 may be trained to determine a probability of user interaction associated with one or more items, based on the characteristics of a particular website, such as the shipping or payment options available when using the website. Based on the determined probability, an arrangement of items in an output that maximizes the probability of a purchase, lease, subscription, or other type of interaction with one or more of the items may be determined. Weight values 130 determined based on the steps performed in blocks 204 through 214 may be used to determine the affect different transactions associated with the first and second websites may have in the probability that a user of the first website may purchase or otherwise interact with an item when presented in an output. After the machine learning model 102 is trained, the machine learning model 102 may be used to determine responses to subsequent search queries 138 or other types of output.

For example, at 218, a search query 138 may be received. The search query 138 may include one or more query parameters 110(3), which may include terms or keywords, arrangements of the terms or keywords, languages associated with the terms or keywords, and so forth. One or more items available for purchase, lease, subscription, and so forth using the first website may be associated with item characteristics 112 that correspond to the query parameters 110(3) of the search query 138, and in some implementations, user data 142 associated with the search query 138.

At 220, the machine learning model 102 may be used to determine output data 150 that includes items that correspond to the search query 138 and an arrangement of the items based on the probability of user interaction 114 with one or more of the items. For example, output data 150 may include information indicative of items having item characteristics 112 that correspond to the query parameters 110(3) of the search query 138, and an output arrangement 148 that is determined based on the probability of user interaction 114 with one or more of the presented items. Continuing the example, the output arrangement 148 may cause items that are more likely to be purchased by a user to be presented prior to other items. As another example, the output arrangement 148 may cause items that are more likely to be of interest to a user to be presented closer to a selected region of a display area, such as a top or a center of the display area.

Figure 3:
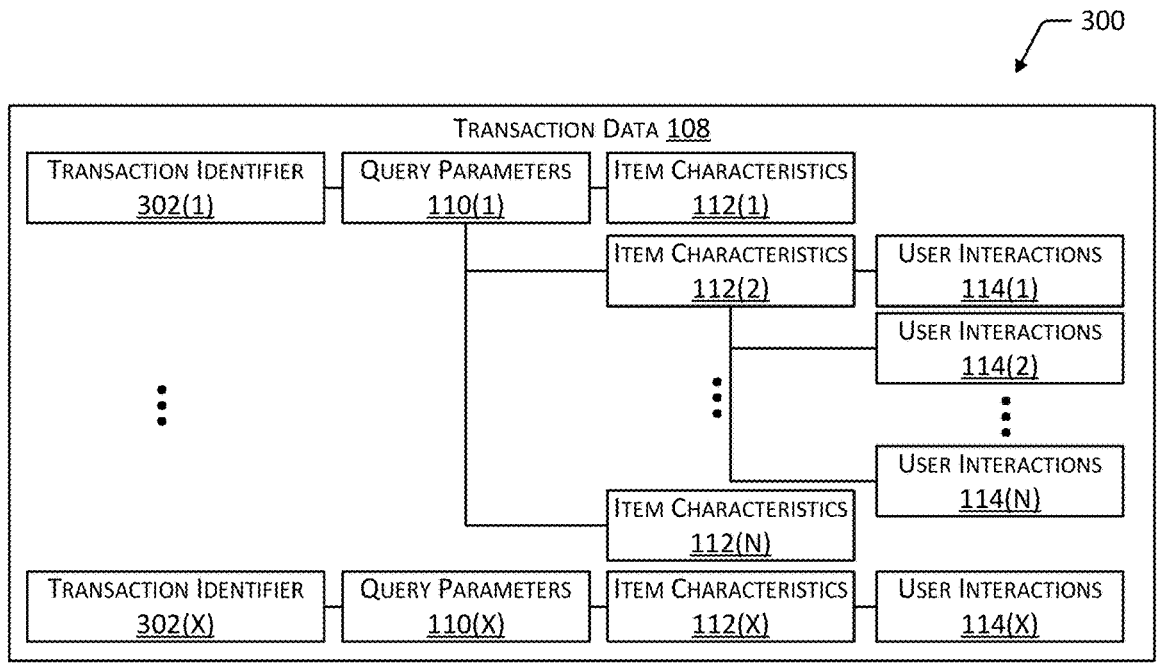
FIG. 3 is a block diagram illustrating example implementations of transaction data and website data usable to train a machine learning model to determine responses to queries, or other types of output.
Figure 3:
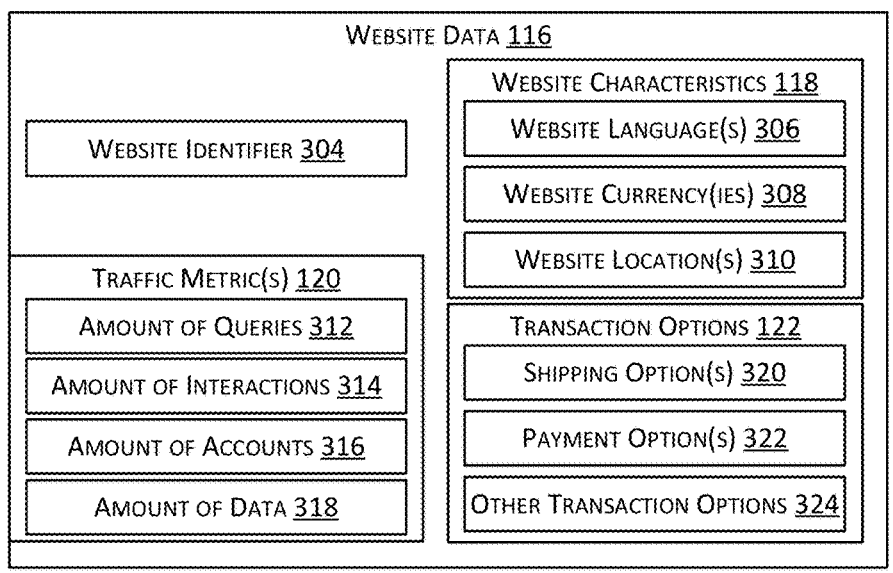

FIG. 3 is a block diagram 300 illustrating example implementations of transaction data 108 and website data 116 usable to train a machine learning model 102 to determine responses to queries. As described with regard to FIGS. 1 and 2, transaction data 108 may represent one or more transactions associated with a website during a selected time period. A transaction may include receipt of a search query 138 having one or more query parameters 110 in response to which an output that includes one or more items having item characteristics 112 that correspond to the query parameters 110 may be presented. User interactions 114 may then be received with regard to one or more of the items presented in the output. User interactions 114 may include purchasing an item or service, leasing or renting an item or service, purchasing a subscription for an item or service, selecting a link or control to obtain additional information regarding an item or service, adding an indication of an item or service to an electronic list or shopping cart, and so forth.

FIG. 3 depicts example transaction data 108 for multiple transactions, in which a first transaction may be represented by a transaction identifier 302(1). The transaction identifier 302(1) may include any type of data that may be used to differentiate the first transaction from other transactions, such as data indicative of a user, user account, or user device 140, a hardware or software component of a user device 140, a session identifier, a name, number, textual, or alphanumeric string, and so forth. The transaction identifier 302(1) may be associated with query parameters 110(1) that represent the parameters of a search query 138 or other type of request that was received from a user device 140. Query parameters 110(1) may include terms or keywords included in a query, an arrangement of the terms or keywords, a language associated with the terms or keywords, numerals or punctuation included in the query, and so forth. In some implementations, query parameters 110(1) may also include filters or other controls that may be applied to a query. Additionally, in some implementations, query parameters 110(1) may include other types of input, such as selection of links or other controls associated with particular items, categories of items, or other characteristics of items. While FIG. 3 depicts a single set of query parameters 110(1) associated with the transaction identifier 302(1), any number of sets of query parameters 110 may be received. For example, a user may refine a search query 138, select additional filters for use, use controls to modify an arrangement of an output, and so forth.

The query parameters 110(1) may be associated with one or more sets of item characteristics 112 for items having characteristics that at least partially correspond to the query parameters 110(1). Item characteristics 112(1) may include an item name, brand, manufacturer, price, size, color, category, rating, review, description, image, and so forth. Item characteristics 112(1) may also include shipping or payment options available for an item. For example, expedited shipping may be possible for certain items but not possible for other items. Any number of items having item characteristics 112 that correspond to the query parameters 110(1) may be determined. For example, FIG. 3 depicts a first set of query parameters 110(1) associated with a first set of item characteristics 112(1) that may represent a first item, a second set of item characteristics 112(2) that may represent a second item, and any number of additional sets of item characteristics 112(N). One or more sets of user interactions 114 may be associated with a set of item characteristics 112. For example, FIG. 3 depicts a first set of user interactions 114(1), a second set of user interactions 114(2), and any number of additional sets of user interactions 114(N), associated with a second set of item characteristics 112(2). Continuing the example, each set of user interactions 114 may include use of one or more controls or links to obtain additional information regarding an item or a particular item characteristic 112, to add an indication of an item to an electronic list or shopping cart, to purchase an item, and so forth. In some cases, user interactions 114 may include data indicative of the position of a cursor associated with a pointer device, the location of a touch or near-touch gesture, the orientation of a gaze of a user determined using one or more cameras, and so forth. While FIG. 3 depicts multiple sets of user interactions 114 associated with the second item characteristics 112(2), user interactions 114 may be associated with any of the determined sets of item characteristics 112. Additionally, while FIG. 3 depicts the transaction data 108 including example query parameters 110, item characteristics 112, and user interactions 114 associated with a first transaction identifier 302(1), any number of additional transaction identifiers 302(X) may be associated with any number of additional sets of query parameters 110(X), item characteristics 112(X), and user interactions 114(X).

As described with regard to FIGS. 1 and 2, website data 116 may include data indicative of the characteristics of a website, such as languages or currencies used to purchase items from an online store associated with the website, indications of amounts of traffic, transactions, or queries received by the website, and options available for the shipping or payment associated with items or services. While FIG. 3 depicts a single set of website data 116, any number of websites may be associated with any number of sets of website data. For example, a single website may serve multiple locations using different languages, currencies, and so forth, and different amounts of traffic and different transaction options 122 may be available to different locations. In such a case, multiple sets of website data 116 may be associated with the website.

The website data 116 may include a website identifier 304 indicative of a website. The website identifier 304 may include a name, title, numeral, text or alphanumeric string, or any other type of data that may be used to differentiate a particular website from other websites. The website data 116 may also include an indication of one or more website characteristics 118. Website characteristics 118 may include website language(s) 306 associated with a website, such as human languages in which content may be presented or input may be received. Website characteristics 118 may include website currencies 308, which may include currencies that may be used as payment for items or services, distributed to users for returns of items, as discounts or incentives, and so forth. Website currencies 308 may include currencies used by one or more countries or other regions, one or more types of credit instruments, digital currencies, and so forth. Website characteristics 118 may also include an indication of one or more website locations 310, which may include geographic regions, such as countries, states, cities, counties, particular addresses, and so forth.

The website data 116 may also include one or more traffic metrics 120, which may represent amounts of data, traffic, or transactions associated with a website. For example, traffic metrics 120 may include an amount of queries 312 received in association with a website for a selected period of time. Amounts of queries 312 may include a total number of queries received, queries received with regard to particular categories of items, queries received from a particular subset of users, user devices 140, or user accounts, and so forth. Traffic metrics 120 may include an amount of interactions 314 received in association with a website for a selected period of time. Amounts of interactions 314 may include amounts of purchases, leases, or subscriptions, amounts of items added to electronic lists or shopping cards, amounts of items for which navigation to particular webpages occurred, and so forth. Traffic metrics 120 may include an amount of accounts 316 associated with a website. Accounts may include user accounts associated with users or user devices 140, accounts associated with sellers of items, and so forth. Traffic metrics 120 may include an amount of data 318 sent or received in association with a website for a period of time. For example, data received by a website may include search queries 138 and user interactions 114, while data sent by a website may include responses to search queries 138, confirmations of purchases or presentation of additional information in response to user interactions 114, and so forth.

The website data 116 may additionally include one or more transaction options 122 associated with a website. Transaction options 122 may include shipping options 320 associated with the shipping, transport, or other types of fulfilment of orders for items. For example, shipping options 320 may include types of shipping, such as expedited shipping, possible shipping destinations, such as residential or business addresses, storage or distribution facilities, possible shipping methods, such as manned or unmanned delivery vehicles, and so forth. Transaction options 122 may also include payment options 322, such as the ability to purchase an item using installment payments, certain types of currencies, credit instruments, or payment processors, and so forth. Other transaction options 324 may include conditions under which certain shipping options 320 or payment options 322 become available, such as during certain time periods, for certain items, for items having certain characteristics, for combinations of items having certain characteristics such as a price threshold for an order that includes multiple items, and so forth.

Figure 4A:
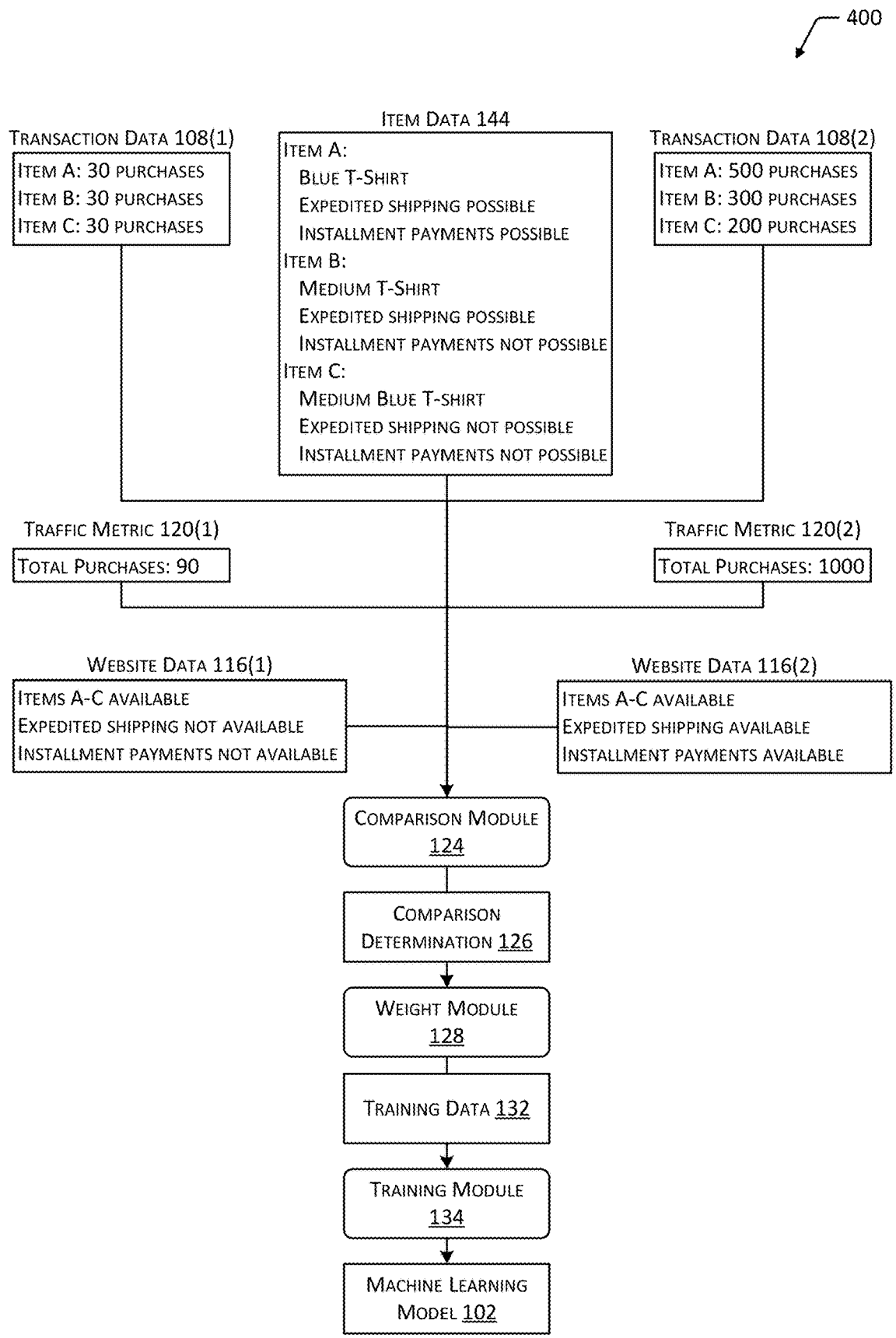
FIGS. 4A and 4B are diagrams depicting an example implementation of a system for training a machine learning model and using the machine learning model to determine search outputs using different websites.
Figure 4B:
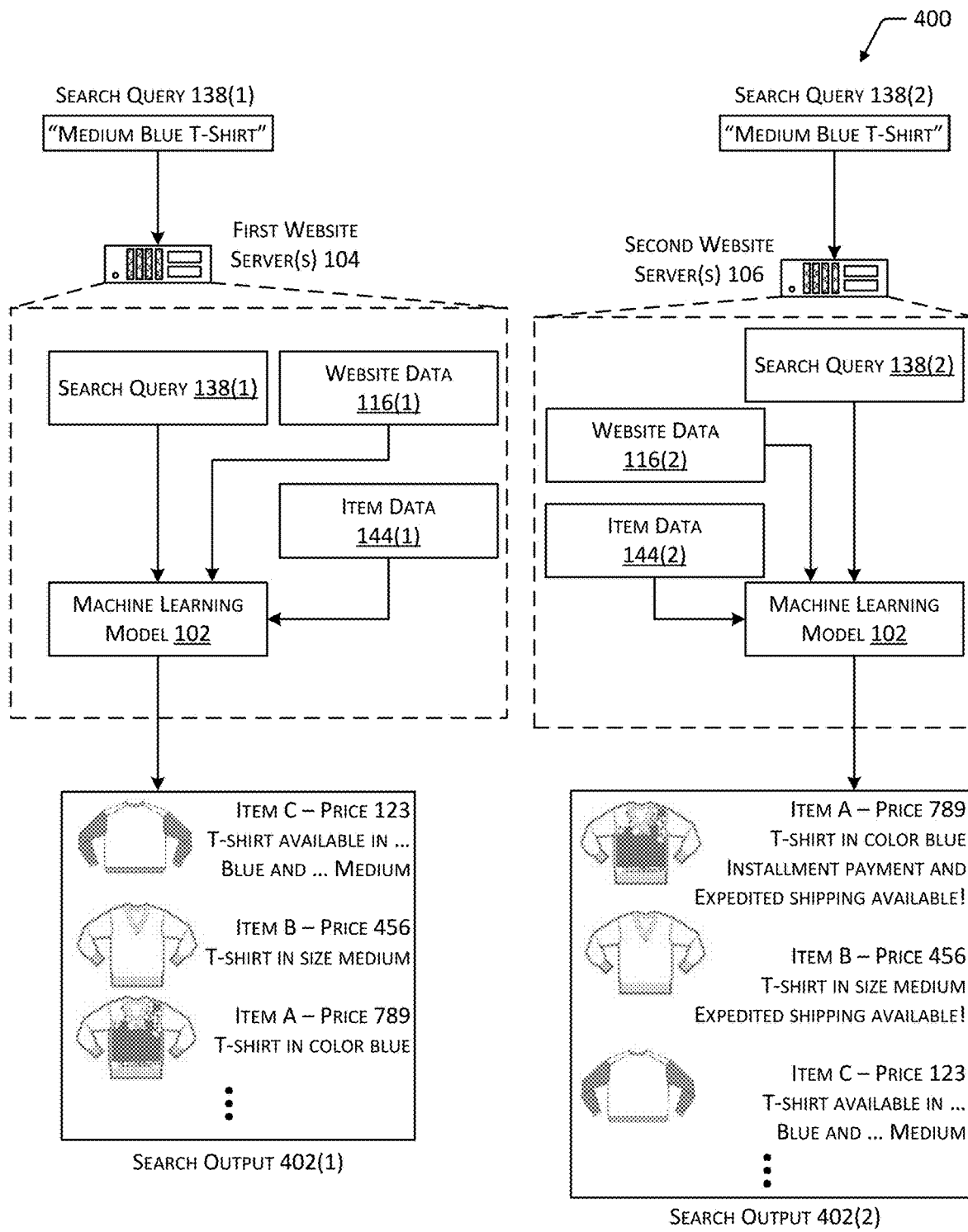

FIGS. 4A and 4B are diagrams 400 depicting an example implementation of a system for training a machine learning model 102 and using the machine learning model 102 to determine search outputs 402 using different websites. As described with regard to FIGS. 1 and 2, one or more weight values 130 may be associated with different portions of transaction data 108 from different websites based on relationships between the transaction data 108 and website data 116 associated with different websites.

For example, FIG. 4A depicts first transaction data 108(1) associated with a first website. The first transaction data 108(1) represents example transactions associated with three items (e.g., "Item A", "Item B", and "Item C"), such as a count of purchases, leases, subscriptions, or other user interactions for each represented item. The transaction data 108(1) may represent transactions that occurred during a selected period of time, for selected categories of items, or in association with a selected subset of users, user accounts, or user devices 140. One example traffic metric 120(1) for the first website may include a count of purchases, leases, subscriptions, or other user interactions associated with the first website. For example, FIG. 4A depicts a count of total purchases based on the transaction data 108(1). Website data 116(1) associated with the first website may include an indication of items that are available for purchase, lease, subscription, and so forth, and one or more transaction options 122, such as whether expedited shipping and installment payments are available for one or more of the items. FIG. 4A depicts example website data 116(1) for the first website in which expedited shipping and installment payments are not available when using the first website.

FIG. 4A also depicts transaction data 108(2) associated with a second website. In the example shown in FIG. 4A, the second website may include a greater quantity of traffic when compared to the first website. For example, the transaction data 108(2) for the second website indicates a larger count of purchases for each of the three items when compared to the transaction data 108(1) associated with the first website, and the traffic metric 120(2) associated with the second website indicates a significantly larger total quantity of purchases for the second website when compared to that of the first website. Website data 116(2) for the second website may include an indication of items that are available for purchase, lease, subscription, and so forth, and one or more transaction options 122 for the second website. For example, FIG. 4A depicts example website data 116(2) for the second website in which expedited shipping and installment payments are available when using the second website.

Each website may also be associated with item data 144 indicative of item characteristics 112 of one or more items available for purchase, lease, subscription, and so forth. For example, FIG. 4A depicts item data 144 for a first item (e.g., "Item A") that includes properties of the item itself (e.g., "Blue T-Shirt"), and an indication that expedited shipping and installment payments may be used when purchasing the first item. The item data 144 for a second item (e.g., "Item B") includes properties of the second item (e.g., "Medium T-Shirt") and an indication that expedited shipping is possible but installment payments are not possible when purchasing the second item. The item data 144 for a third item (e.g., "Item C") includes properties of the third item (e.g., "Medium Blue T-Shirt") and indications that expedited shipping and installment payments are not possible when purchasing the third item. While FIG. 4A depicts a single example of item data 144, each website may be associated with respective item data 144, and the item data 144 for a first website may include one or more items not included in the item data 144 for a second website, and vice versa. As such, while FIG. 4A depicts item data 144 that includes three example items, any number of items may be included in the item data 144 for a first website, and the item data 144 for a second website may include any number of items that are identical to or differ from the items represented in the item data 144 for the first website.

As described with regard to FIG. 1, to determine training data 132 for use training a machine learning model 102, a comparison module 124 associated with one or more computing devices may determine a relationship between the transaction data 108 for each website and the website data 116 for each website. For example, a comparison determination 126 may indicate, based on a comparison between the first traffic metric 120(1) and the second traffic metric 120(2), that the second website is associated with a significantly greater amount of purchases than the first website. In some cases, the comparison determination 126 may include a ratio, an arithmetic difference, a percentage, or another type of relationship between the first traffic metric 120(1) and the second traffic metric 120(2). The comparison determination 126 may also indicate differences in one or more transaction options 122 associated with each website. For example, the comparison determination 126 may indicate that the first website does not offer expedited shipping or installment payments, while the second website does offer these transaction options 122.

A weight module 128 associated with the computing device(s) may determine weight values 130 based on the comparison determination 126 and training data 132 that associates weight values 130 with respective portions of transaction data 108 based on certain conditions. For example, a lower weight value 130 or a weight value 130 of zero may be associated with an item characteristic 112 indicative of the possibility to transport an item using expedited shipping when website data 116 for a website indicates that expedited shipping is not available when using the website. Conversely, a higher weight value 130 may be used in association with the item characteristic 112 if the website data 116 for a website indicates that expedited shipping is available when using the website. As a result, a machine learning model 102 that is trained using the training data 132 and training module 134 may account for characteristics of a specific website, based on website data 116, when determining a response to a search query 138. For example, a response to a search query 138 may include items for which expedited shipping is available prior to other items in cases where expedited shipping is available when using a website, but may disregard this item characteristic 122 and present a response having a different output arrangement 148 in cases where expedited shipping is not available when using a website.

For example, FIG. 4B depicts one or more first website servers 104 associated with a first website receiving a first search query 138(1), and one or more second website servers 106 associated with a second website receiving a second search query 138(2) that is substantially identical to the first search query 138(1). Based on the query parameters 110 of the first search query 138(1), a machine learning model 102 may determine a search output 402(1) based on item data 144(1) and website data 116(1) associated with the first website server(s) 104. For example, as shown in FIG. 4A, three items may at least partially correspond to a search query 138(1) that includes the terms "Medium Blue T-Shirt", and use of expedited shipping and installment payments may be possible for one or more of the items, however based on the website data 116(1) for the first website, use of expedited shipping and installment payments are not available when using the first website. As a result, a search output 402(1) associated with the first website may include an output arrangement 148 for the presented items based on a low weight value 130 or a weight value 130 of zero associated with item characteristics 112 relating to possible use of expedited shipping or installment payments.

In contrast, website data 116(2) for the second website servers 106 may indicate that use of expedited shipping and installment payments is available when using the second website. As a result, the machine learning model 102 may apply a greater weight to item characteristics 112 for item data 144(2) associated with the second website that indicate a possible use of expedited shipping or installment payments when determining a search output 402(2) for the second website. As shown in FIG. 4B, the search output 402(2) for the second website may include a different output arrangement 148 for the presented items based on the differing website data 116 for each website and the item characteristics 112 for the presented items. Therefore, based on data specific to each website, a different search output 402 may be determined even though the same machine learning model 102 was used for each website and a substantially identical search query 138 was received. While FIG. 4B depicts example search outputs 402 in which three items available using both the first and second websites are shown having a different arrangement, in some cases, a search output 402 for the first website may include one or more items not available using the second website, and vice versa.

Figure 5:
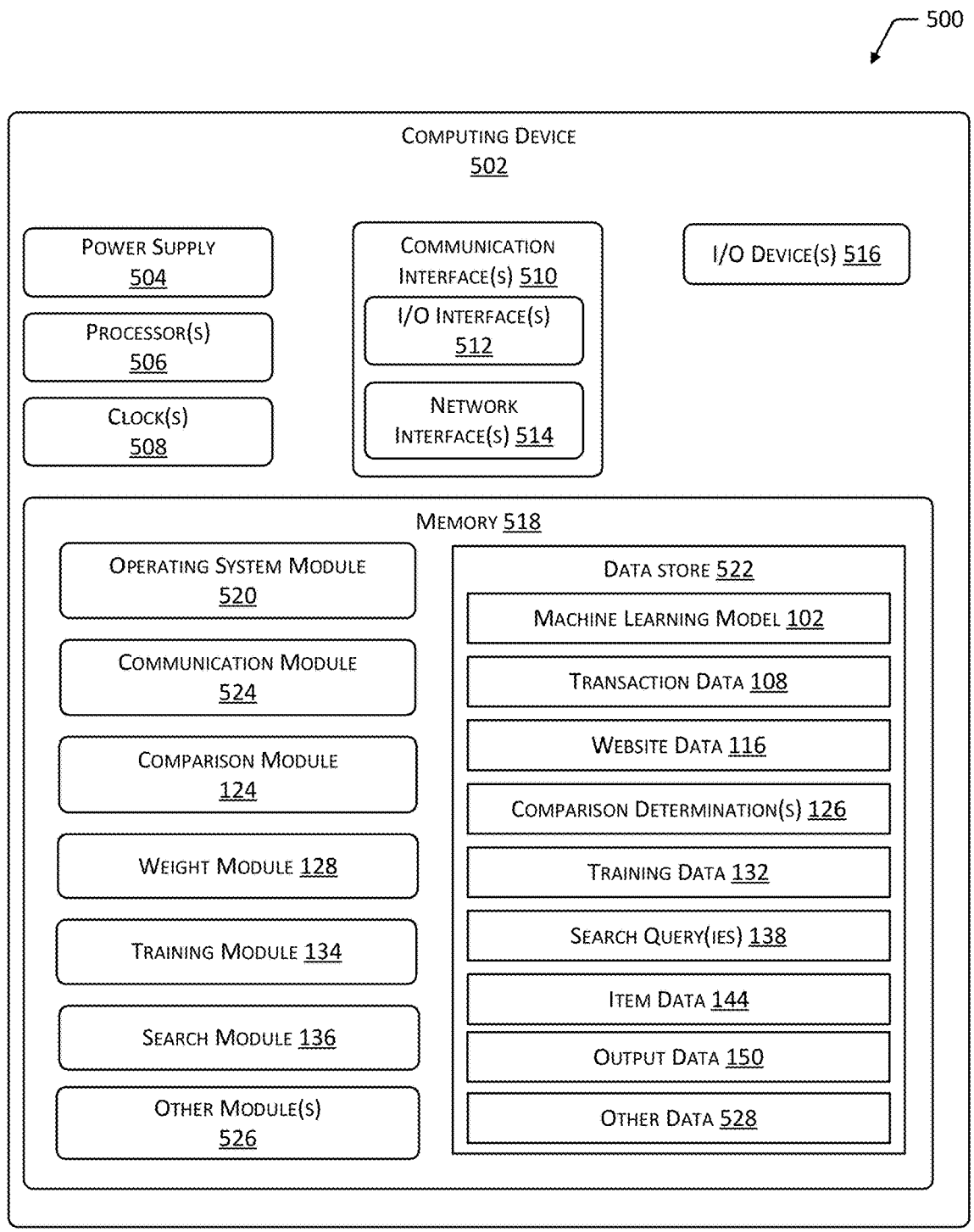
FIG. 5 is a block diagram depicting an implementation of a computing device within the present disclosure.

FIG. 5 is a block diagram 500 depicting an implementation of a computing device 502 within the present disclosure. In some implementations, the computing device 502 may include one or more servers or other types of computing devices 502 associated with a website that receives search queries 138, determines output data 150 in response to a search query 138, and processes transactions and other types of user interactions 114 associated with the output data 150. In other implementations, the computing devices 502 may communicate with servers or other computing devices 502 associated with websites and processing of search queries 138. For example, a first computing device 502 may train a machine learning model 102, while a second computing device 502 may use the machine learning model to determine output data 150 based on search queries 138. While FIG. 5 depicts a single block diagram 500 of a computing device 502, any number and any type of computing devices 502 may be used to perform the functions described herein.

One or more power supplies 504 may be configured to provide electrical power suitable for operating the components of the computing device 502. In some implementations, the power supply 504 may include a rechargeable battery, fuel cell, photovoltaic cell, power conditioning circuitry, and so forth.

The computing device 502 may include one or more hardware processor(s) 506 (processors) configured to execute one or more stored instructions. The processor(s) 506 may include one or more cores. One or more clock(s) 608 may provide information indicative of date, time, ticks, and so forth. For example, the processor(s) 506 may use data from the clock 508 to generate a timestamp, trigger a preprogrammed action, and so forth.

The computing device 502 may include one or more communication interfaces 510, such as input/output (I/O) interfaces 512, network interfaces 514, and so forth. The communication interfaces 510 may enable the computing device 502, or components of the computing device 502, to communicate with other computing devices 502 or components of the other computing devices 502. The I/O interfaces 512 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 512 may couple to one or more I/O devices 516. The I/O devices 516 may include any manner of input devices or output devices associated with the computing device 502. For example, I/O devices 516 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 516 may be physically incorporated with the computing device 502. In other implementations, I/O devices 516 may be externally placed.

The network interfaces 514 may be configured to provide communications between the computing device 502 and other devices, such as the I/O devices 516, routers, access points, and so forth. The network interfaces 514 may include devices configured to couple to one or more networks including local area networks (LANs), wireless LANs (WLANs), wide area networks (WANs), wireless WANs, and so forth. For example, the network interfaces 514 may include devices compatible with Ethernet, Wi-Fi, Bluetooth, ZigBee, Z-Wave, 3G, 4G, 5G, LTE, and so forth.

The computing device 502 may include one or more buses or other internal communications hardware or software that allows for the transfer of data between the various modules and components of the computing device 502.

As shown in FIG. 5, the computing device 502 may include one or more memories 518. The memory 518 may include one or more computer-readable storage media (CRSM). The CRSM may be any one or more of an electronic storage medium, a magnetic storage medium, an optical storage medium, a quantum storage medium, a mechanical computer storage medium, and so forth. The memory 518 may provide storage of computer-readable instructions, data structures, program modules, and other data for the operation of the computing device 502. A few example modules are shown stored in the memory 518, although the same functionality may alternatively be implemented in hardware, firmware, or as a system on a chip (SoC).

The memory 518 may include one or more operating system (OS) modules 520. The OS module 520 may be configured to manage hardware resource devices such as the I/O interfaces 512, the network interfaces 514, the I/O devices 516, and to provide various services to applications or modules executing on the processors 506. The OS module 520 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Washington, USA; or other operating systems.

One or more data stores 522 and one or more of the following modules may also be associated with the memory 518. The modules may be executed as foreground applications, background tasks, daemons, and so forth. The data store(s) 522 may use a flat file, database, linked list, tree, executable code, script, or other data structure to store information. In some implementations, the data store(s) 522 or a portion of the data store(s) 522 may be distributed across one or more other devices including other computing devices 502, network attached storage devices, and so forth.

A communication module 524 may be configured to establish communications with one or more other computing devices 502. Communications may be authenticated, encrypted, and so forth.

The memory 518 may also store the comparison module 124. The comparison module 124 may determine correspondence between website data 116 for different websites, such as similarities or differences between traffic metrics 120, available transaction options 122, and website characteristics 118 such as languages, currencies, or locations associated with websites. A comparison determination 126 indicative of the similarities or differences between the transaction data 108 and website data 116 associated with different websites may be used to determine weights to be associated with different portions of the data when training the machine learning model 102. For example, query parameters 110 and item characteristics 112 associated with a first website may be weighted based on the user interactions 114 that were received by the first website. Item characteristics 112 associated with the first website, such as the possibility to ship a particular item using expedited shipping, may be weighted based on transaction options 122 for the first website, such as the availability or unavailability of expedited shipping, the conditions under which expedited shipping is available, and so forth. Data associated with the second website may be associated with weights based on similarities or differences between characteristics of the second website and those of the first website. For example, transaction data 108 associated with a second website may be associated with a low weight or a weight of zero based on differences between the languages, currencies, and locations associated with the first and second websites, or associated with a greater weight based on similarities between such website characteristics 118. Data associated with a second website may similarly be weighted based on similarities or differences between the traffic metrics 120 associated with the websites and the transaction options 122 associated with the websites. For example, if a second website is associated with a significantly greater number of received search queries when compared to the first website, this may result in data associated with the second website being associated with a lower weight. Conversely, if the second website is associated with a significantly lower number of received search queries when compared to the first website, this may result in data associated with the second website being associated with a higher weight. As another example, if the second website is associated with a particular transaction option 122, such as expedited shipping, and this transaction option 122 is not available using the first website, transactions associated with the second website that involve an item that is available using expedited shipping may be associated with a lesser weight or a weight of zero.

The memory 518 may additionally store the weight module 128. The weight module 128 may determine one or more sets of weight values 130 to be associated with portions of transaction data 108 associated with one or more websites. The weight module 128 may determine training data 132 that may be used to train a machine learning model 102 based on the transaction data 108 for one or more websites, the website data 116 for the website(s), and weight values 130 determined based in part on the comparison determination 126. A set of weight values 130 may include different weight values 130 that are associated with different portions of corresponding transaction data 108. For example, transactions having particular characteristics, such as particular query parameters 110, item characteristics 112, or user interactions 114, may be associated with a particular weight value 130, while other transactions are associated with different weight values 130.

The memory 518 may also store the training module 134. The training module 134 may determine a machine learning model 102 based at least in part on at least a portion of the training data 132. As described with regard to FIG. 1, training data 132 may associate portions of transaction data 108 from different websites with corresponding weight values 130. The machine learning model 102 may be determined based in part on transaction data 108, weight values 130, website data 116 associated with the website(s), and in some implementations, user data 142 such as a purchase history, search history, browsing history, location, or other characteristics associated with a user, user account, or user device 140. The machine learning model 102 may be configured to determine responses to queries that optimize the probability that a purchase, lease, subscription, or other type of user interaction 114 may occur. For example, in response to a search query 138, an output arrangement 148 may be determined based in part on the machine learning model 102 that may arrange information regarding items in a manner that maximizes the probability that a purchase, lease, subscription, or other type of user interaction will occur.

The memory 518 may store the search module 136. The search module 136 may receive and process search queries 138, such as through use of natural language processing, parsing techniques, and so forth, to determine query parameters 110 based on the search query 138. Query parameters 110 may include terms or keywords, arrangements of terms or keywords, languages associated with terms of keywords, punctuation and numerals, and so forth. The search module 136 may also determine user data 142 indicative of a user account, user device 140, and so forth, based on a received search query 138. The search module 136 may determine correspondence between the query parameters 110 of the search query 138 and item data 144 indicative of one or more items available for purchase, lease, subscription, and so forth. As described with regard to FIG. 1, item data 144 may associate item identifiers 146 indicative of particular items with corresponding item characteristics 112 for each item. Based on correspondence between the item characteristics 112 of the item data 144 and the query parameters 110 of the search query 138, the search module 136 may determine a particular subset of items having item characteristics 112 that correspond to the query parameters 110. Based on the machine learning model 102, the search module 136 may determine an output arrangement 148 associated with the determined items. For example, the machine learning model 102 may be used to determine an order or arrangement for information associated with the determined items that may maximize a probability that a purchase, lease, subscription, or other user interaction 114 associated with one or more of the items will occur. The search module 136 may determine output data 150 that may be provided to a computing device 502 to cause presentation of information regarding the determined items based on the determined output arrangement 148.

Other modules 526 may also be present in the memory 518. For example, other modules 526 may include permission or authorization modules to enable users to access and modify data associated with the computing device 502. Other modules 526 may also include encryption modules to encrypt and decrypt communications between computing devices 502, authentication modules to authenticate communications sent or received by computing devices 502, user interface modules to generate interfaces for receiving input from users, and so forth. Other modules 526 may additionally include modules for providing access to user interfaces in response to user input to navigational links or other controls, language processing modules for analyzing search queries 138 and determining output, modules for completing purchase transactions, interfacing with payment processors or shipping providers, and so forth.

Other data 528 within the data store(s) 522 may include configurations, settings, preferences, and default values associated with computing devices 502. Other data 528 may also include encryption keys and schema, access credentials, and so forth.

In different implementations, different computing devices 502 may have different capabilities or capacities. For example, website servers may have greater processing capabilities or data storage capacity than user devices 140.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
    determining first transaction data indicative of a first plurality of transactions associated with a first website executing on a first set of servers;
    determining second transaction data indicative of a second plurality of transactions associated with a second website executing on a second set of servers;
    using a comparison module associated with one or more of the first set of servers, the second set of servers, or a third set of servers to:
        determine one or more of:
            a first traffic metric associated with the first website; or
            first website options indicative of one or more of: first purchasing options or first shipping options associated with the first website;
        determine one or more of:
            a second traffic metric associated with the second website; or
            second website options indicative of one or more of: second purchasing options or second shipping options associated with the second website; and
        determine a first difference between one or more of:
            the first traffic metric and the second traffic metric, or
            the first website options and the second website options;
    using a weight module associated with the one or more of the first set of servers, the second set of servers, or the third set of servers to determine one or more first weights associated with at least a first portion the second transaction data based on the first difference, wherein the one or more first weights have an inverse relationship to a size of the first difference;
    training, on the one or more of the first set of servers, the second set of servers, or the third set of servers, a machine learning model based on the first transaction data, the second transaction data, and the one or more first weights, to determine probabilities of user interactions associated with items that are associated with the first website, wherein the one or more first weights at least partially determine an effect of the at least the first portion of the second transaction data on outputs determined using the machine learning model; and
    in response to an input and based on the machine learning model, determining output data indicative of one or more items based on the probabilities.

2. The method of claim 1, further comprising:
    receiving a search query having one or more parameters;
    based on the machine learning model, the one or more parameters, and a plurality of items associated with the first website, determining:
        a subset of the plurality of items that corresponds to the one or more parameters; and
        an arrangement of the subset based on a probability of user interaction associated with each item of the subset; and
    providing the output data to a computing device to cause the computing device to present an output indicative of the subset of the plurality of items having the arrangement.

3. The method of claim 1, wherein the one or more first weights are based on the first difference between the first traffic metric and the second traffic metric, the method further comprising:
    determining one or more second weights based on a second difference between the first website options and the second website options, wherein the one or more second weights have an inverse relationship to a size of the second difference;
    and wherein the machine learning model is further trained based on the one or more second weights.

4. The method of claim 1, wherein:
    each transaction of the first plurality of transactions is indicative of:
        a first search query having one or more first parameters;
        a first plurality of items that were included in a first response to the first search query, wherein each item of the first plurality of items has one or more first characteristics; and
        a subset of the first plurality of items that are associated with one or more user interactions after the first plurality of items were included in the first response; and
    each transaction of the second plurality of transactions is indicative of:
        a second search query having one or more second parameters;
        a second plurality of items that were included in a second response to the second search query, wherein each item of the second plurality of items has one or more second characteristics; and
        a subset of the second plurality of items that are associated with one or more user interactions after the second plurality of items were included in the second response.

5. The method of claim 4, further comprising:
    determining one or more second weights associated with the one or more first parameters and the one or more first characteristics based on the subset of the first plurality of items that are associated with one or more user interactions after the first plurality of items were included in the first response, wherein the machine learning model is further trained based on the one or more second weights.

6. The method of claim 5, further comprising:
    determining a characteristic of the one or more first characteristics that is associated with a website option not indicated in the first website options, wherein the characteristic of the one or more first characteristics is excluded in determination of the one or more second weights.

7. The method of claim 1, wherein:
    the first traffic metric includes one or more of:
        a first count of search queries received in association with the first website;
        a first count of user interactions associated with the first website;
        a first count of user accounts associated with the first website; or a first quantity of data received in association with the first website; and the second traffic metric includes one or more of:
- a second count of search queries received in association with the second website;
- a second count of user interactions associated with the second website;
- a second count of user accounts associated with the second website; or
- a second quantity of data received in association with the second website.

8. The method of claim 1, further comprising:
determining first website characteristics indicative of one or more of: a first language, a first currency, or a first location associated with the first website;
determining second website characteristics indicative of one or more of: a second language, a second currency, or a second location associated with the second website; and
determining correspondence between the first website characteristics and the second website characteristics, wherein the machine learning model is trained based on the second transaction data and the one or more first weights in response to the correspondence between the first website characteristics and the second website characteristics.

9. The method of claim 1, further comprising:
determining first website characteristics indicative of one or more of: a first language, a first currency, or a first location associated with the first website; and
determining second website characteristics indicative of one or more of: a second language, a second currency, or a second location associated with the second website;
wherein the one or more first weights are further determined based on correspondence between the first website characteristics and the second website characteristics.

10. The method of claim 1, further comprising:
determining correspondence between one or more of:
- the first traffic metric and the second traffic metric; or
- the first website options and the second website options;

wherein the machine learning model is trained based on the second transaction data and the one or more first weights in response to the correspondence.

11. The method of claim 1, further comprising:
determining item data indicative of a plurality of items associated with the second website, wherein each item of the plurality of items is associated with one or more characteristics;
wherein in response to the second website options indicating a website option that is not indicated in the first website options, a weight value of zero is determined for a characteristic of the one or more characteristics that is associated with the website option.

12. A system comprising:
a first set of servers associated with a first website;
a second set of servers associated with a second website;
one or more memories associated with one or more of the first set of servers, the second set of servers, or a third set of servers, wherein the one or more memories store computer-executable instructions; and
one or more hardware processors associated with the one or more of the first set of servers, the second set of servers, or the third set of servers, to execute the computer-executable instructions to:

determine first transaction data indicative of a first plurality of transactions associated with the first website, wherein each transaction of the first plurality of transactions is associated with one or more of:
- a first traffic metric associated with the first website; or
- first website options indicative of one or more of: first purchasing options or first shipping options associated with the first website;

determine second transaction data indicative of a second plurality of transactions associated with the second website wherein each transaction of the second plurality of transactions is associated with one or more of:
- a second traffic metric associated with the second website; or
- second website options indicative of one or more of: second purchasing options or second shipping options associated with the second website;

use a comparison module to:
determine a first difference between one or more of:
- the first traffic metric and the second traffic metric, or
- the first website options and the second website options;

use a weight module to:
determine one or more first weights based on the first plurality of transactions; and
determine one or more second weights based on the first difference, wherein the one or more second weights have an inverse relationship to a size of the first difference;

train, using the one or more of the first set of servers, the second set of servers, or the third set of servers, a machine learning model based on the first transaction data, the second transaction data, the one or more first weights, and the one or more second weights, to determine probabilities of user interactions associated with items that are associated with the first website, wherein the one or more second weights at least partially determine an effect of the second transaction data on outputs determined using the machine learning model; and in response to an input and based on the machine learning model, determine output data indicative of one or more items based on the probabilities.

13. The system of claim 12, wherein each transaction of the first plurality of transactions is further associated with:
a first search query having one or more first parameters;
a first plurality of items that were included in a first response to the first search query, wherein each item of the first plurality of items has one or more first characteristics; and
a subset of the first plurality of items that are associated with user interactions after the first plurality of items were included in the first response; and the system further comprising computer-executable instructions to:
determine one or more third weights associated with the one or more first parameters and the one or more first characteristics, wherein the one or more third weights are determined based on the subset of the first plurality of items that are associated with one or more user interactions after the subset of the first plurality of items were included in the first response, and wherein the machine learning model is further trained based on the one or more third weights.

14. The system of claim 12, wherein one or more of: at least a subset of the one or more first weights or at least a subset of the one or more second weights, are determined based on the first difference between the first traffic metric and the second traffic metric.

15. The system of claim 14, wherein:
the first traffic metric includes one or more of:
a first count of search queries received in association with the first website;
a first count of user interactions associated with the first website;
a first count of user accounts associated with the first website; or
a first quantity of data received in association with the first website; and
the second traffic metric includes one or more of:
a second count of search queries received in association with the second website;
a second count of user interactions associated with the second website;
a second count of user accounts associated with the second website; or
a second quantity of data received in association with the second website.

16. The system of claim 12, wherein one or more of: at least a subset of the one or more first weights or at least a subset of the one or more second weights, are determined based on a relationship between the first website options and the second website options.

17. The system of claim 12, further comprising computer-executable instructions to:
determine first website characteristics indicative of one or more of: a first language, a first currency, or a first location associated with the first website;
determine second website characteristics indicative of one or more of: a second language, a second currency, or a second location associated with the second website; and
determine correspondence between the first website characteristics and the second website characteristics;
wherein the second transaction data is determined in response to the correspondence between the first website characteristics and the second website characteristics.

18. The system of claim 12, further comprising computer-executable instructions to:
determine correspondence between the one or more of: the first traffic metric and the second traffic metric, or the first website options and the second website options;
wherein in response to the correspondence, the machine learning model is further trained based on the second transaction data.

19. A system comprising:
a first set of servers associated with a first website;
a second set of servers associated with a second website;
one or more memories associated with one or more of the first set of servers, the second set of servers, or a third set of servers, wherein the one or more memories store computer-executable instructions; and
one or more hardware processors associated with the one or more of the first set of servers, the second set of servers, or the third set of servers, to execute the computer-executable instructions to:
determine first transaction data indicative of a first plurality of transactions associated with the first website, wherein each transaction of the first plurality of transactions is associated with one or more of:
a first traffic metric associated with the first website; or
first website options indicative of one or more of: first purchasing options or first shipping options associated with the first website;
determine second transaction data indicative of a second plurality of transactions associated with the second website wherein each transaction of the second plurality of transactions is associated with one or more of:
a second traffic metric associated with the second website; or
second website options indicative of one or more of: second purchasing options or second shipping options associated with the second website;
use a comparison module to determine one or more of:
a first difference between the first traffic metric and the second traffic metric; or
a second difference between the first website options and the second website options;
use a weight module to determine one or more first weights based on the one or more of the first difference or the second difference, wherein the one or more first weights have an inverse relationship to a size of one or more of the first difference or the second difference;
train, using the one or more of the first set of servers, the second set of servers, or the third set of servers, a machine learning model based on the first transaction data, the second transaction data, and the one or more first weights, to determine probabilities of user interactions associated with items that are associated with the first website, wherein the one or more first weights at least partially determine an effect of the second transaction data on outputs determined using the machine learning model; and
in response to an input and based on the machine learning model, determine output data indicative of one or more items based on the probabilities.

20. The system of claim 19, wherein the input includes a search query having one or more parameters, the system further comprising computer-executable instructions to:
based on the machine learning model, the one or more parameters, and item data indicative of characteristics of a plurality of items available for purchase using the first website, determine:
a subset of the plurality of items that corresponds to the one or more parameters; and
an arrangement of the subset of the plurality of items based on a probability for purchase of each item of the subset of the plurality of items determined using the machine learning model; and
determine the output data based on the arrangement.

* * * * *